US011057932B2

(12) United States Patent
Geethanjali

(10) Patent No.: US 11,057,932 B2
(45) Date of Patent: Jul. 6, 2021

(54) INCREASING DOWNSTREAM NETWORK THROUGHPUT FROM ACCESS POINTS IN DATA COMMUNICATION SYSTEMS USING TRANSMIT OPPORTUNITIES FROM RTS (REQUEST TO SEND)FRAME ERRORS

(71) Applicant: Fortinet, Inc., Sunnyvale, CA (US)

(72) Inventor: Srinivas Geethanjali, Bangaluru (IN)

(73) Assignee: Fortinet, Inc., Sunnyvale, CA (US)

( * ) Notice: Subject to any disclaimer, the term of this patent is extended or adjusted under 35 U.S.C. 154(b) by 194 days.

(21) Appl. No.: 16/237,413

(22) Filed: Dec. 31, 2018

(65) Prior Publication Data

US 2020/0214039 A1 Jul. 2, 2020

(51) Int. Cl.
*H04W 74/08* (2009.01)
*H04L 12/24* (2006.01)

(52) U.S. Cl.
CPC ....... *H04W 74/0816* (2013.01); *H04L 41/069* (2013.01)

(58) Field of Classification Search
CPC .......................... H04W 74/0816; H04L 41/069
See application file for complete search history.

(56) References Cited

U.S. PATENT DOCUMENTS

| 2007/0115847 | A1* | 5/2007 | Strutt | H04L 43/00 370/252 |
| 2009/0067358 | A1* | 3/2009 | Fischer | H04L 12/1868 370/312 |
| 2014/0254459 | A1* | 9/2014 | Gelal | H04L 12/18 370/312 |
| 2017/0325262 | A1* | 11/2017 | Tomeba | H04W 72/0446 |
| 2019/0268915 | A1* | 8/2019 | Li | H04W 74/08 |

* cited by examiner

*Primary Examiner* — Ajay Cattungal
(74) *Attorney, Agent, or Firm* — Law Office of Dorian Cartwright; Dorian Cartwright

(57) ABSTRACT

A sender of the RTS frame is decoded based on the symbol error sequence and a station database within the access point, even if there is a CRC (cyclical redundancy checking) failure. The access point seizes the transmit opportunity during RTS reception failure, as collision results in higher back off window before stations can transmit. To minimize the impact of collision on voice clients, some embodiments prioritize transmission of voice packets within the new transmit opportunity.

6 Claims, 5 Drawing Sheets

INCREASING DOWNSTREAM NETWORK THROUGHPUT FROM ACCESS POINTS IN DATA COMMUNICATION SYSTEMS USING TRANSMIT OPPORTUNITIES FROM RTS (REQUEST TO SEND) FRAME ERRORS

FIELD OF THE INVENTION

The invention relates generally to computer networking improvements, and more specifically, to increasing downstream network throughput from an access point using transmit opportunities from RTS (request to send) frame errors.

BACKGROUND

Communication systems are susceptible to interference, whether wireless or wireline. Interference can come in the form of external noise and also in the form of interfering signals from various stations of the communication systems themselves. To this end, interference from other wireless stations increases due to the hidden node problem, where a wireless node is visible from a wireless access point (AP), but not from other nodes communicating with that access point. Without visibility, a station and a hidden node can access a channel at the same time causing collisions of transmitted network packets, and with collisions, air time utilization reduces effectively resulting in lower wireless throughput.

To partially overcome the hidden node problem, RTS/CTS (request to send/clear to send) handshaking within IEEE 802.11 networking protocols are implemented as virtual carrier sensing in conjunction with the carrier sense multiple access with collision avoidance (CSMA/CA) scheme. RTS/CTS flow control can make use of two pins on an RS232 connector, an RTS pin and a CTS pin. A transmitter raises its RTS line, which causes an interrupt on the receiver. If the receiver is in a position to receive the data it will assert its CTS line.

However, the problem of collision for RTS frames themselves still remains and causes increasing backoff times from transmission for stations. This additional overhead can potentially cancel any benefit of RTS/CTS flow control altogether. Furthermore, contention windows and interframe spacing cause additional channel access loss.

Therefore, what is needed is a robust technique for increasing downstream network throughput from an access point using transmit opportunities from RTS frame errors.

SUMMARY

These shortcomings are addressed by the present disclosure of methods, computer program products, and systems for increasing downstream network throughput from an access point using transmit opportunities from RTS (Request to Send) frame errors.

In one embodiment, the sender of the RTS frame is decoded based on the symbol error sequence and a station database within the access point, even if there is a CRC (cyclical redundancy checking) failure. The access point seizes the transmit opportunity during RTS reception failure, as collision results in higher back off window before stations can transmit. To minimize the impact of collision on voice clients, some embodiments prioritize transmission of voice packets within the new transmit opportunity.

In another embodiment, the proposed techniques are implemented in the 802.11 MAC layer firmware or hardware responsible for control frame handling.

Advantageously, network performance increases with improved throughput despite RTS errors from collisions.

BRIEF DESCRIPTION OF THE FIGURES

In the following figures, like reference numbers are used to refer to like elements. Although the following figures depict various examples of the invention, the invention is not limited to the examples depicted in the figures.

DETAILED DESCRIPTION

The present invention provides methods, computer program products, and systems for increasing downstream network throughput from an access point using transmit opportunities from RTS (Request to Send) frame errors. One of ordinary skill in the art will recognize that many other scenarios are possible, given the present disclosure, as discussed in more detail below.

Figure 1:
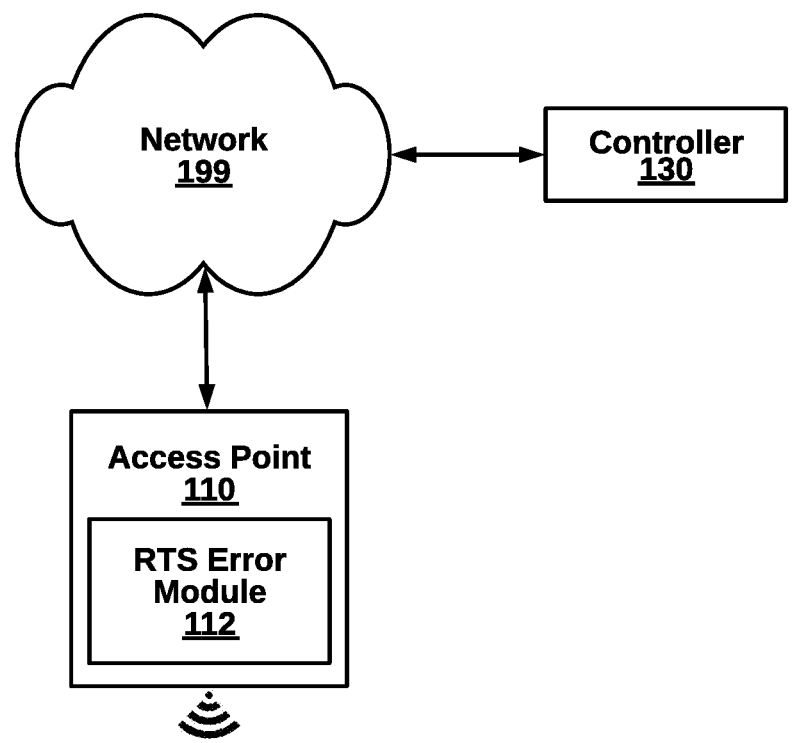
FIG. 1 is a high-level block diagram illustrating a system to transmit high priority frames during RTS errors without contention, according to one embodiment.
Figure 1:
Figure 2:
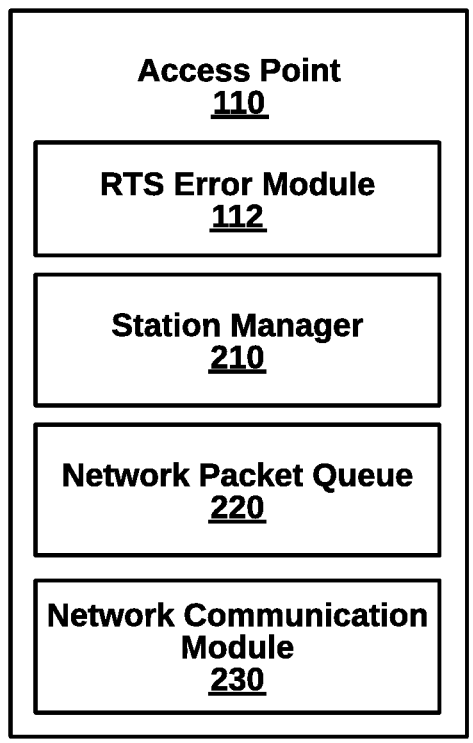
FIG. 2 is a more detailed block diagram illustrating internal components of an access point from the system of FIG. 1, according to some embodiments.

Systems to Increase Throughput During RTS Frame Errors (FIGS. 1-2)

FIG. 1 is a high-level block diagram illustrating a system 100 to transmit high priority frames during RTS errors without contention, according to one embodiment. The system 100 comprises an access point 110, wireless stations 120A-C, and controller 130. Many other configurations are possible. For example, additional network components can also be part of the system 100, such as firewalls, virus scanners, routers, switches, application servers, databases, and the like. Each of the components in the system 100 are communicatively coupled through the network 199.

Network 199 can be the Internet, a WAN, a LAN, a Wi-Fi, or other type of data communication network providing a data channel for components of the system 100. Control of the network can be by a business organization, a government agency, or an individual household, without limitation to other possibilities. The components can use data channel protocols, such as IEEE 802.11a/b/g, IEEE 802.11n, 802.11ac, or other versions of the 802.11 and other wireless standards. Referring specifically to FIG. 1, the access point 110 is coupled across the network 199 preferably over wired connections. In turn, the stations 120A-C are coupled to the access point 110, preferably over wireless connections.

The access point 110 further comprises an RTS error module 112 to identify transmit opportunities for increasing throughput. In operation, when the access point 110 detects RTS frames from a station of the plurality of stations within network traffic, a request channel access without contention to send additional data has been made. The access points 110 attempts deciding the RTS frame to determine a transmitter address and a duration field value. Responsive to successfully decoding an RTS fame, a CTS (clear to send) frame is sent to the specific station for channel access. On the other hand, responsive to not successfully decoding an RTS frame (e.g., due to a CRC error), data frames are transmitted during the RTS backoff period. To do so in one embodiment, a self-CTS frame is sent from the access point, including a NAV (network allocation vector) duration period for continuing channel access without any channel contention. Then the access point can send data packets to stations, or alternatively, a station can seize the transmit opportunity due to the RTS packet error. The wireless stations listening on the wireless medium read the duration field and set their NAV value, which is an indicator for a station on how long it must defer from accessing the medium, in microseconds.

RTS errors can be due to collisions or channel conditions. Discarding RTS frames in error, causes missed transmit opportunities (TxOP) which in-turn leads to loss of throughput due to retransmissions and Contention Window (CW) back-offs. This could be avoided by trying RTS frame recovery and extracting valid fields in the frame. For every frame that is received in error, it is possible to get a feedback from the PHY layer about the error probabilities of each symbol of the frame. Feedback from the PHY layer will depend on the distance in signal space between received symbol's constellation point and the decoded symbol's constellation point. The smaller the distance, the lesser is the symbol error probability. Based on the feedback from PHY layer, MAC layer could reconstruct the partial packet. Partial packet recovery is possible since fading or collision could lead to localized corruption in a frame with the rest of the frame being intact.

Here we focus on RTS frame recovery where the frame type is received correctly and indicates an RTS frame. This gives a few options for error recovery. For RTS frames, if the access point 110 is able to decode the transmitter address (TA) and the duration fields, the access point 110 can send a CTS to the sending station using this information. In this case channel access and subsequent transmissions by station and AP will continue as if there was no RTS frame error. If AP receives RTS frame with a corrupt TA field, it can minimize loss of TxOP by grabbing the channel for a downstream transmission. In an Infrastructure BSS, downstream traffic in general, achieve lower throughput when compared to upstream traffic. This is true even though the access point 110 gets higher channel access priority due to better contention parameters like DIFS, CW values. This happens since each upstream flow contends separately for the channel while all downstream flows together contend for channel through the access point 110. Each access point, in some embodiments, TxOP translates to TxOP for only one downstream flow.

Downstream throughput can be improved considerably by capitalizing on the lost TXOP due to RTS errors. Whenever an RTS received by AP is dropped due to unrecoverable errors, AP can send a self-CTS, without any channel contention, for the highest priority traffic queued in its buffers. This will ensure that all stations receiving the self-CTS will update their NAVs based on its duration field and AP can continue downstream transmission. Following this, AP can send the buffered data within the TxOP it has claimed. In this way each missed upstream TxOP due to RTS errors, is converted into a downstream TxOP by AP. Stations other than the RTS-receiver need to defer NAV duration before attempting Tx. RTS sent by a station could result in NAV being updated on some stations which receive the RTS without error. For other hidden nodes and stations, the NAV may not be updated.

In one embodiment, the access point 110 off-loads RTS error determinations to the controller 130. From the perspective of the controller 130, performing RTS error determinations for multiple access points allows uniform implementation of network policies with standardized decision logic. In addition to the access point 110, there can be several other access points under management of the controller 130. By having contact with multiple access points, the controller 130 is able to track a specific user or a specific device as it moves around different rooms in a building services by different access points. The controller 130 can ensure consistent RTS error behavior throughout the changes in location.

Figure 5:
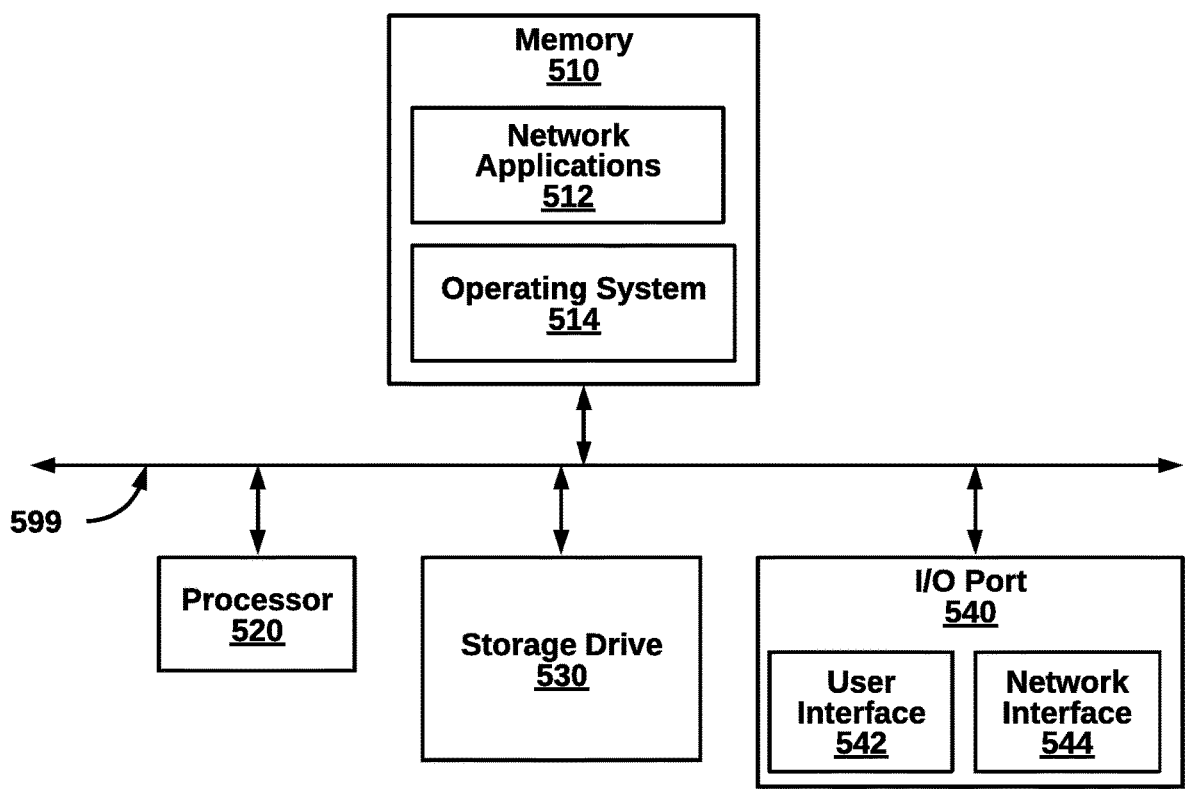
FIG. 5 is a block diagram illustrating an example computing device, according to one embodiment.

The access point 110 physically includes one or more individual access points implemented in any of the computing devices discussed herein (e.g., see FIG. 5). For example, the access point 110 can be an AP 110 or AP 433 (modified as discussed herein) by Fortinet, Inc. of Sunnyvale, Calif. A network administrator can strategically place the access point 120 for optimal coverage area over a locale. The access point 120 can, in turn, be connected to a wired hub, switch or router connected to the enterprise network 199 (or an external network). In embodiment, access point functionality is incorporated into a switch or router. In another embodiment, the access point 110 is a virtual device in whole or in part. Further embodiments of the access point 110 are discussed with respect to FIG. 2.

Additionally, the stations 120A-B of the system 100 can be implemented in any of the computing devices discussed herein, for example, a personal computer, a laptop computer, a tablet computer, a smart phone, a mobile computing device, a server, a cloud-based device, a virtual device, an Internet appliance, or any of the computing devices described herein, using hardware and/or software (see e.g., FIG. 5).

Generally, the network components of the system 100 can be implemented in any of the computing devices discussed herein, for example, a personal computer, a laptop computer, a tablet computer, a smart phone, a mobile computing device, a server, a cloud-based device, a virtual device, an Internet appliance, or any of the computing devices described herein, using hardware and/or software (see e.g., FIG. 5). No client configuration or download is needed for this particular technique, although a client app can be downloaded for optimizations.

FIG. 2 is a more detailed block diagram illustrating internal components of the access point 110 from the system of FIG. 1, according to some embodiments. The access point 110 comprises the RTS error module 112, station manager 210, network packet queue 220, and network communication module 230.

The RTS error module 112 can be implemented, in part, by a specialized ASIC or other computer hardware that is optimized for airtime fairness determinations. In an embodiment, an operating system of the access point 110 is updated with a patch to implement RTS error determination. In another embodiment, a separate RTS error server (not pictured) is in communication with the access point 110.

The station manager 210 can oversee connections to different wireless stations and manage associated BSSIDs (basic service set identifiers).

The network packet queue 220 can store data packets while being processed and until ready for transmission.

The network communication module 230 includes APIs, networking software and hardware ports and protocols, and radios needed to communicate with access points, stations, external databases and severs, and the like. The network communication module 230 can include the MAC layer and the PHY layer from the OSI network protocol stack. Data and ACK frames are sent on the physical channel. Additionally, back off times and contention widows (CW min and CW max) area decided by PHY characteristic so of the medium.

II. Methods for Increasing Throughput During RTS Frame Errors (FIGS. 3-4)

Figure 3:
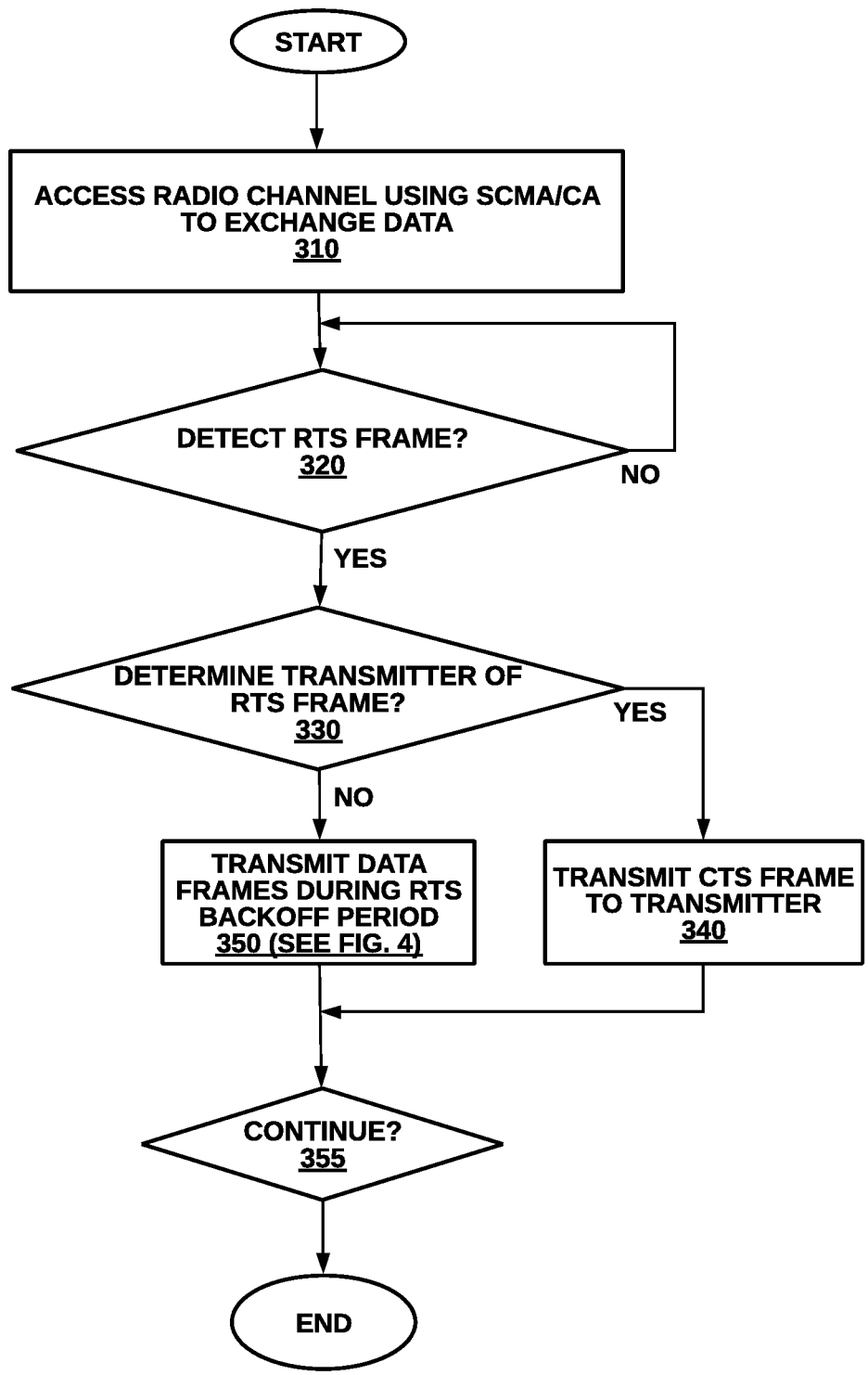
FIG. 3 is a high-level flow diagram illustrating a method for transmitting high priority frames during RTS errors without contention, according to one embodiment.
Figure 4:
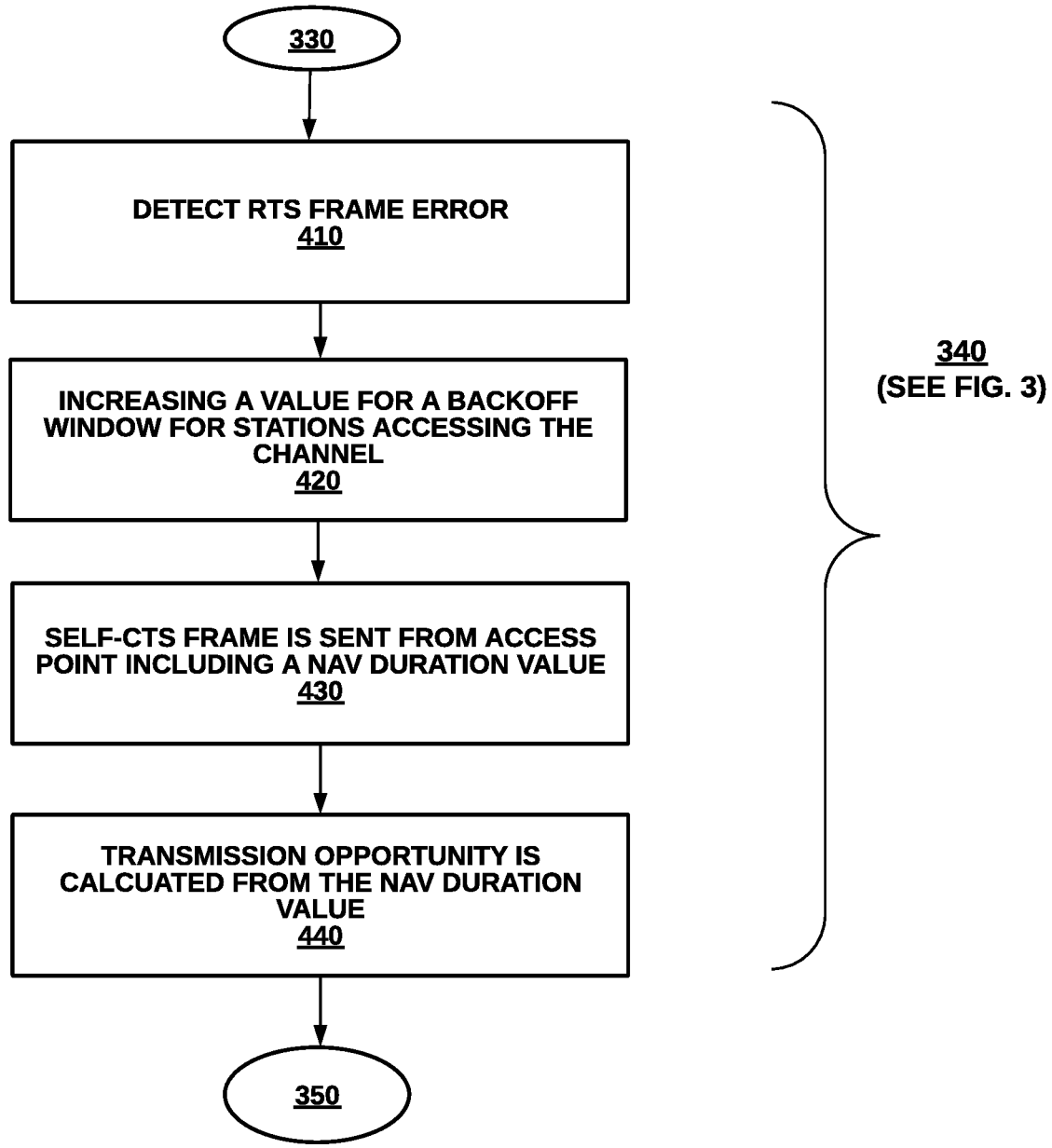
FIG. 4 is a more detailed flow diagram illustrating a step of transmitting data frames during the RTS backoff period, from the method of FIG. 5, according to one embodiment.

FIG. 3 is a high-level flow diagram illustrating a method 300 for transmitting high priority frames during RTS errors without contention, according to one embodiment. The method 300 can be implemented by the system 100 of FIG. 1 or a different system. One of ordinary skill in the art will recognize that the method 300 is non-limiting as other embodiments can have more or less steps and can be performed in a different order.

At step 310, a radio channel using CSMA/CA (carrier-sense multiple access with collision avoidance) is accessed to exchange data and at step 320, detect RTS (request to send) frames from a specific station of the plurality of stations within network traffic on the data communication network. The RTS frames request channel access without contention to send additional data.

At step 330, a decode attempt is made on each RTS frame to determine a transmitter address and a duration field value.

At step 340, and responsive to successfully decoding an RTS fame, a CTS (clear to send) frame is sent to the specific station for channel access.

At step 350, and responsive to not successfully decoding an RTS frame, data frames are transmitted during the RTS backoff period, as detailed further with respect to FIG. 4.

At step 355, the process continues until ended.

FIG. 4 is a more detailed flow diagram illustrating the step 340 for transmitting data frames during the RTS backoff period, from the method of FIG. 3, according to one embodiment.

At step 410, and responsive to not successfully decoding an RTS frame an RTS frame error is detected.

At step 420, the RTS error results in a higher value of backoff window for stations before making further attempts for channel access.

At step 430, a self-CTS frame is sent from the access point, including a NAV duration period for continuing channel access without any channel contention. The wireless stations listening on the wireless medium read the duration field and set their NAV value, which is an indicator for a station on how long it must defer from accessing the medium, in microseconds.

At step 440, a transmission opportunity is calculated from the NAV value before returning to step 450 for data frame transmissions during the RTS backoff period.

III. Generic Computing Device (FIG. 5)

FIG. 5 is a block diagram illustrating an exemplary computing device 500 for use in the system 100 of FIG. 1, according to one embodiment. The computing device 500 is an exemplary device that is implementable for each of the components of the system 100, including the access point 110 and the wireless stations 120A-C. The computing device 500 can be a mobile computing device, a laptop device, a smartphone, a tablet device, a phablet device, a video game console, a personal computing device, a stationary computing device, a server blade, an Internet appliance, a virtual computing device, a distributed computing device, a cloud-based computing device, or any appropriate processor-driven device.

The computing device 500, of the present embodiment, includes a memory 510, a processor 520, a storage drive 530, and an I/O port 540. Each of the components is coupled for electronic communication via a bus 599. Communication can be digital and/or analog, and use any suitable protocol.

The memory 510 further comprises network applications 512 and an operating system 514. The network applications 512 can include the modules of the access point 110 and the wireless stations 120A-C, as illustrated in FIGS. 1-2. Other network applications 512 can include a web browser, a mobile application, an application that uses networking, a remote application executing locally, a network protocol application, a network management application, a network routing application, or the like.

The operating system 514 can be one of the Microsoft Windows® family of operating systems (e.g., Windows 95, 98, Me, Windows NT, Windows 2000, Windows XP, Windows XP x74 Edition, Windows Vista, Windows CE, Windows Mobile, Windows 10, Windows 7 or Windows 8), Linux, HP-UX, UNIX, Sun OS, Solaris, Mac OS X, Alpha OS, AIX, IRIX32, or IRIX74. Other operating systems may be used. Microsoft Windows is a trademark of Microsoft Corporation.

The processor 520 can be a network processor (e.g., optimized for IEEE 802.11), a general-purpose processor, an application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 520 can be single core, multiple core, or include more than one processing elements. The processor 520 can be disposed on silicon or any other suitable material. The processor 520 can receive and execute instructions and data stored in the memory 510 or the storage drive 530.

The storage drive 530 can be any non-volatile type of storage such as a magnetic disc, EEPROM (electronically erasable programmable read-only memory), Flash, or the like. The storage drive 530 stores code and data for applications.

The I/O port 540 further comprises a user interface 542 and a network interface 544. The user interface 542 can output to a display device and receive input from, for example, a keyboard. The network interface 544 (e.g. RF antennae) connects to a medium such as Ethernet or Wi-Fi for data input and output.

Many of the functionalities described herein can be implemented with computer software, computer hardware, or a combination.

Computer software products (e.g., non-transitory computer products storing source code) may be written in any of various suitable programming languages, such as C, C++, C #, Oracle® Java, JavaScript, PHP, Python, Perl, Ruby, AJAX, and Adobe® Flash®. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface with other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.11ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

I claim:

1. A computer-implemented method for an access point communicatively coupled to a plurality of stations on a data communication network, the method for increasing downstream network throughput using transmit opportunities during RTS errors without channel contention, and the method comprising:
    accessing a radio channel using CSMA/CA (carrier-sense multiple access with collision avoidance) to receive RTS (request to send) frames from a specific station of the plurality of stations within network traffic on the data communication network, the RTS frames requesting channel access without contention to send additional data;
    attempting to decode each RTS frame to determine a transmitter address and a duration field value;
    responsive to successfully decoding an RTS fame, sending a CTS (clear to send) frame to the station for channel access; and
    responsive to not successfully decoding an RTS frame:
        detecting an RTS error, wherein the RTS error results in a higher value of backoff window for the specific station before making further attempts for channel access;
        sending a self-CTS frame, without any channel contention, including a NAV (network allocation vector) duration period for continuing channel access without any channel contention; and
        transmitting frames during the RTS backoff period.

2. The method of claim 1, wherein the transmitting frames during the RTS backoff period comprises transmitting high priority frames during the RTS backoff period.

3. The method of claim 1, wherein the RTS error results from at least one of a corrupt transmitter address and duration field of the RTS frame.

4. The method of claim 1, wherein the RTS error is caused by two stations of the plurality of stations having different NAV duration periods.

5. A non-transitory computer-readable medium storing source code that, when executed by a processor, performs a method for an access point communicatively coupled to a plurality of stations on a data communication network, the method for increasing downstream network throughput using transmit opportunities during RTS errors without channel contention, and the method comprising:
    accessing a radio channel using CSMA/CA (carrier-sense multiple access with collision avoidance) to receive RTS (request to send) frames from a specific station of the plurality of stations within network traffic on the data communication network, the RTS frames requesting channel access without contention to send additional data;
    attempting to decode each RTS frame to determine a transmitter address and a duration field value;
    responsive to successfully decoding an RTS fame, sending a CTS (clear to send) frame to the station for channel access; and
    responsive to not successfully decoding an RTS frame:
        detecting an RTS error, wherein the RTS error results in a higher value of backoff window for the specific station before making further attempts for channel access;
        sending a self-CTS frame, without any channel contention, including a NAV (network allocation vector) duration period for continuing channel access without any channel contention; and
        transmitting frames during the RTS backoff period.

6. An access point communicatively coupled to a plurality of stations on a data communication network, the for increasing downstream network throughput using transmit opportunities during RTS errors without channel contention, and the access point comprising:
    a processor;
    a network communication interface communicatively coupled to the processor and coupled to the data communication system; and
    a memory device, comprising:
        a first module to access a radio channel using CSMA/CA (carrier-sense multiple access with collision avoidance) to receive RTS (request to send) frames from a specific station of the plurality of stations within network traffic on the data communication network, the RTS frames requesting channel access without contention to send additional data;
        a second module to attempt to decode each RTS frame to determine a transmitter address and a duration field value;
        a third module to, responsive to successfully decoding an RTS fame, send a CTS (clear to send) frame to the station for channel access; and
        a fourth module to, responsive to not successfully decoding an RTS frame:
            detect an RTS error, wherein the RTS error results in a higher value of backoff window for the specific station before making further attempts for channel access, and
            send a self-CTS frame, without any channel contention, including a NAV (network allocation vector)

duration period for continuing channel access without any channel contention; and a fifth module to transmit frames during the RTS backoff period.

* * * * *